July 13, 1954  M. CASSÉ  2,683,299
MACHINE FOR FELTING
Filed Nov. 14, 1950  2 Sheets-Sheet 1
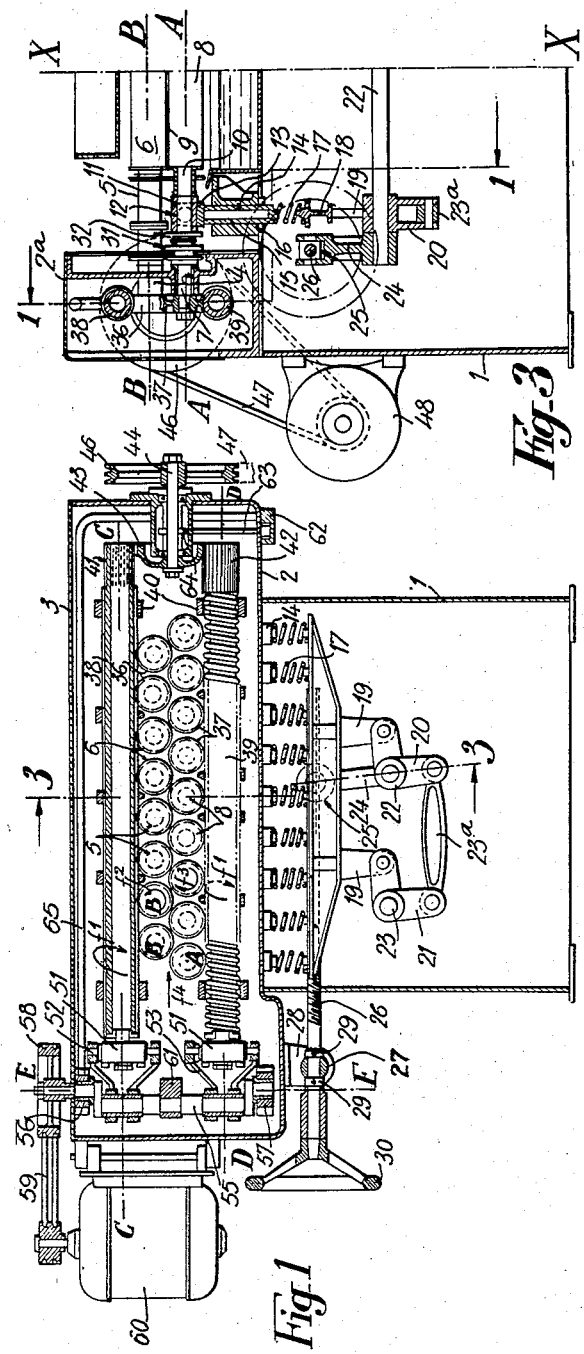
Fig. 1
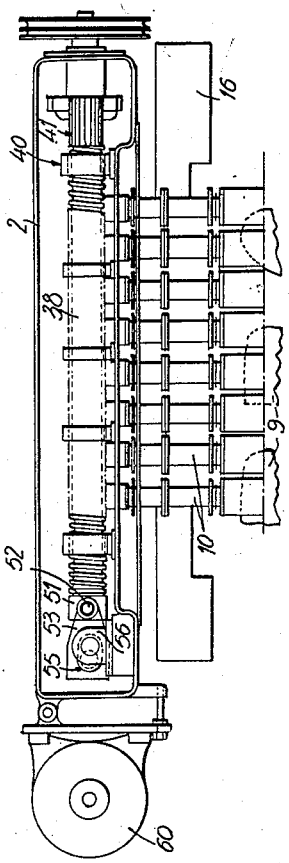
Fig. 2
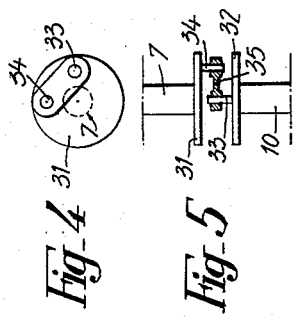
Fig. 3 / Fig. 4 / Fig. 5
INVENTOR
MARCEL CASSE
BY *Robert G. Burns*
ATTORNEY

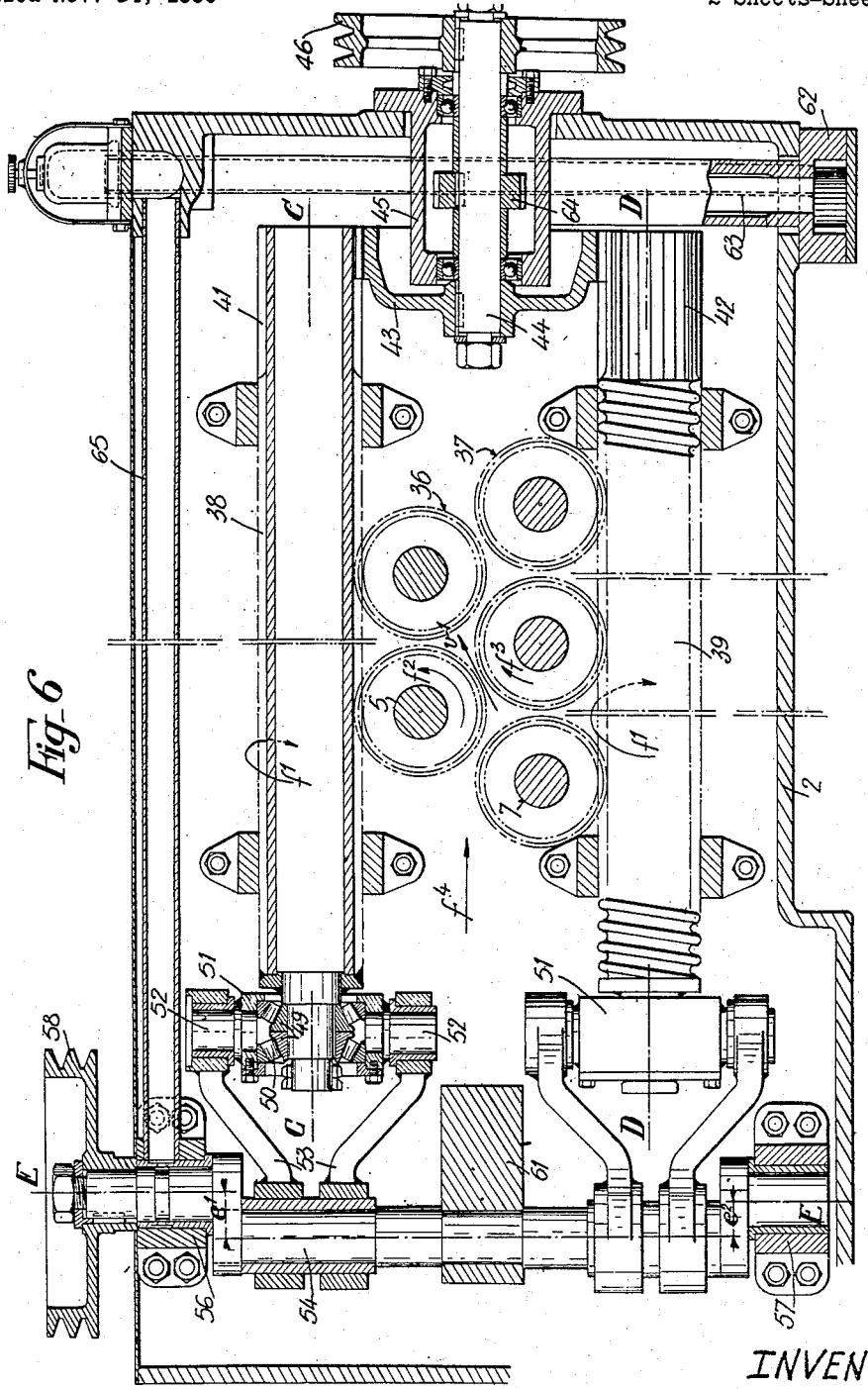

Patented July 13, 1954

2,683,299

UNITED STATES PATENT OFFICE 2,683,299

MACHINE FOR FELTING

Marcel Cassé, Essonnes, France

Application November 14, 1950, Serial No. 195,537
Claims priority, application France
December 21, 1949

11 Claims. (Cl. 28—5)

The present invention relates to the felting of hat bodies and other articles made of fibers possessing felting properties and to the multi-roller felting machines.

Numerous forms of such machines have been already proposed in particular in the hat-making industry. They comprise two or three beds of rollers the axes of which are parallel. The articles to be felted for example hoods i. e. hat bodies are passed between these beds. The rollers have imparted thereto, simultaneously: On the one hand a general rotary movement of constant speed, which moves the articles to be felted at a speed termed the "rate of passage" which is of the order of about five to twelve metres per minute, such speed being limited with due regard to the rate of feeding of the machine by the operator and in such a way that the articles will remain for a certain period of time between the rollers, and, on the other hand, relative axial or circumferential oscillatory movements of very low amplitude (few millimeters) termed a "shaking movement"; the frequency of this shaking or vibratory movements should be as high as possible for the purpose of increasing the production.

In such known machines, the felting action results simultaneously from undulations produced by the articles to be felted between the successive rollers and from the said vibratory or shaking movements. The undulations and vibrations cause the advance of the fibres one with respect to another.

It is to be borne in mind that repeated passes between rollers having only a rotary movement produce also a felting action, but the number of passes must be much greater than in the case in which the rollers are actuated with the said shaking or vibratory movements; but these movements frequently bring about, at the end of the felting operation, a deterioration of the felt because of the frictions on the surface of the articles to be felted.

The invention has for its object a method of felting articles, made of fibers possessing felting properties, which consists in imparting to the articles being felted, during the felting operation, rapid reciprocatory movements along an undulatory path, the amplitude of such movements, which is of the order of at least one centimetre, being greater in one direction than in the opposite direction, in such a way as definitely to ensure an advance of said articles along said path.

Owing to the reciprocatory movements of the articles, a much more rapid and regular felting of these articles is obtained.

The invention has particularly for its object a machine provided with at least two beds of rollers, said beds being combined with driving means in such a way that the tangential speeds of cooperating rollers along their lines of contact, which speeds are at least substantially equal and unidirectional, vary periodically and at least substantially between maximum $(v_1+v_2)$ and minimum $(v_1-v_2)$ values, whereby $v_2$ may be greater than $v_1$ and the periodicity is such that the amplitude of the reciprocatory movements imparted to the articles is of the order of at least one centimetre.

Other features of the invention will be apparent from the following description.

In the accompanying drawings, which are given solely by way of example:

Fig. 1 is a vertical longitudinal section, taken along the line 1—1 in Fig. 3, of a felting machine according to the invention;

Fig. 2 is a partial plan view, whereby it is assumed that the cover of the casing containing the actuating mechanism for the rollers has been removed;

Fig. 3 shows one-half of a vertical cross-section taken along the line 3—3 in Fig. 1;

Fig. 4 is a front view of one of the coupling devices adapted to ensure actuation of the rollers of the lower bed, which are regulable in height, this view being shown to enlarged scale as compared with Fig. 3;

Fig. 5 is a corresponding plan view;

Fig. 6 is a part sectional view similar to that in Fig. 1, but to enlarged scale, of the mechanism.

According to the embodiment illustrated, the machine comprises a framework 1, on which there is mounted longitudinally and laterally a casing 2 provided with a removable cover 3. The vertical wall of this casing turned towards the longitudinal vertical middle plane X—X (Fig. 3) of the machine comprises two series of vertical bores 4, having transverse parallel axes A—A and B—B located in two horizontal planes. The upper axes B—B are staggered longitudinally with respect to the lower axes A—A. Trunnions 5 of upper rollers 6 are rotatably mounted in the upper bores, whilst the driving shafts 7 of lower rollers 8 are mounted in the lower bores.

The vertical distance between the two planes containing the geometrical axes A—A and B—B of the two beds of rollers is slightly less than the sum of the radii of a roller 6 and a roller 8, so that the articles to be felted, for example felt hoods 9, and adapted to be passed between the two beds of rollers, must follow an undulatory path.

To permit of the passage of said articles 9 between rollers 6 and 8, under a predetermined and regulable pressure, irrespective of the thickness of these articles, the lower rollers 8 comprise at each end a trunnion 10 which is rotatably mounted in a bearing 11 (Fig. 3). This bearing carries two pins 12 which are oscillatory in a fork 13. The forks appertaining to the different rollers 8 are carried by cylindrical posts 14 sliding in bores 15 in the one or the other of two parallel longitudinal members 16 secured to the framework 1. At their lower ends, the posts 14 rest through the medium of springs 17 on bearers 18. The latter may be raised to varying extent, parallel to themselves, under the action of a control mechanism comprising a deformable parallelogram. For this purpose each of the bearers rests through the medium of two appendices 19 on two levers 20, 21 pivotally connected to two transverse shafts 22, 23 carried by the framework 1. These levers are coupled together by a rod 23ª. The two levers 20, provided on the two sides of the machine, are keyed on to the shaft 22, together with a lever 24. On the end of the latter there is oscillatorily mounted a bush 25 forming a nut into which there is screwed a screw 26. This latter is mounted to rotate in another bush 27, which in turn is mounted to be rotary in a yoke piece 28 (Fig. 1) secured to the casing 2. This screw is held longitudinally by two washers 29 thrusting against the bush 27. On the end of said screw is keyed a control wheel 30.

To permit transmission of the rotary motion between each shaft 7 and the shaft 10 of the corresponding roller 8 movable in height by manipulation of the wheel 30, these shafts 7 and 10 carry two plates 31 and 32 (Figs. 3, 4 and 5). On these plates are mounted pins 33 and 34, and these pins are connected by a short rod 35, in such a way that when the shafts 7 and 10 coincide the two pins 33 and 34 are located at an angle of 90° to one another (position illustrated in Figs. 4 and 5).

For the purpose of imparting rotary motion thereto, the trunnions 5 of the upper rollers 6 and the shafts 7, which are connected in the manner described to the lower rollers 8, carry at their ends hollow-toothed pinions 36 and 37 meshing respectively with an upper worm 38 and a lower worm 39. These longitudinally disposed worms, having the axes C—C and D—D, are rotatably mounted in bearings 40. At one end, the worms 38 and 39 carry spur gears 41 and 42, which both mesh with a pinion 43. This pinion is secured to one end of a shaft 44, which is mounted for rotation in a bearing 45 secured to the end wall of the casing 2. On the other end of the shaft 44, externally of the casing, there is keyed a pulley 46, which is connected by way of a belt 47 with an electric motor 48 mounted on the frame 1 (Fig. 3).

The two gears 41 and 42 may either have the same number of teeth or the number of teeth may slightly vary, for example by one unit, so as to produce a difference in the circumferential velocity of the two beds of rollers.

At the other ends of the worms 38 and 39 there are mounted double abutments 49 (Fig. 6) comprising conical rollers 50 contained within casings 51. Each of these casings 51 carries two vertical stubs 52 on which are pivoted small rods 53. At their other ends these rods 53 are rotatable about the pins, such as 54, of a long crankshaft 55. This crankshaft, having the vertical axis E—E, is mounted to be rotatable in two bearings 56 and 57 carried by the casing 2. A pulley 58 fixed to the upper part of this crankshaft has a continuous rotary motion imparted thereto through the medium of a belt 59 by an electric motor 60. A counterpoise 61 is keyed on to the crankshaft between the two pins 54.

These two pins may have in relation to the axis of the bearings 56, either the same eccentricity or slightly varying degrees of eccentricity $e_1$ and $e_2$ (Fig. 6), so as to produce a slight difference in the alternating longitudinal motion imparted to the worms 38 and 39.

The lubrication of this system is effected by a circulation of oil which is maintained by a gear pump 62 (shown on the right in Figs. 1 and 6) actuated by a vertical shaft 63, which receives its motion from the shaft 44 through the medium of a pair of gears 64. The oil contained in the bottom of the casing 2 is sucked up by the gear pump 62 and delivered into a pipe line 65, which distributes it to the different points to be lubricated.

The operation is as follows: The two motors 48 and 60 having been started, the two worms 38 and 39 are actuated on the one hand by means of a continuous rotary motion about their respective longitudinal axes C—C and D—D respectively in the direction of the arrows $f^1$ by the motor 48 through the medium of the belt 47, the pulley 46, the shaft 44, the pinion 43 and the teeth 41, and on the other hand by means of a translatory alternating motion along the said longitudinal axes under the action of the crankshaft 55 driven by the motor 60.

Under the effect of these movements, the rollers 6 and 8 receive in turn: On the one hand, a general rotary motion about their respective axes A—A and B—B in the direction of the arrows $f^2$ and $f^3$ (Figs. 1 and 6), the tangential speed being either $v_1$ for the two rollers if the gears 41 and 42 have the same number of teeth or $v_1$ for one roller and a slightly lower or greater speed for the other roller if these gears 41 and 42 have a different number of teeth; said tangential speed is directed alternately obliquely upwards and then downwards owing to the relative positions of the rollers; and, on the other hand, an oscillatory motion about their respective axes A—A and B—B, the maximum tangential speeds corresponding to these oscillations being $v_2$ for both beds of rollers assuming the two pins 54 of the crankshaft both have the same eccentricity, or one speed being equal to $v_2$ and the other being slightly different to $v_2$ assuming the eccentricities $e_1$ and $e_2$ are slightly different from one another.

The articles 9 to be felted are introduced between the two beds of rollers according to the arrow $f^4$ (Figs. 1 and 6). They are moved between these rollers and undulate between them, their rate of advance varying between $(v_1+v_2)$ and $(v_1-v_2)$ if the two beds of rollers are driven at the same speed $v_1$ and $v_2$, or substantially between these values if the two beds of rollers have slightly different speeds.

The speed $v_2$ is preferably greater than the speed $v_1$, so that $(v_1+v_2)$ and $(v_1-v_2)$ being of opposite signs the articles 9 are moved by means of a reciprocatory movement along the undulatory path which they follow. Since in any case $(v_1+v_2)$ is greater than $(v_1-v_2)$ in absolute value, the articles are advanced more than they are moved backwards, and introduced into the machine on the left they leave the same on the right.

By way of example, the speed of rotation of the crank shaft 55 may be of the order of 300 revolutions per minute which, in conjunction with a degree of eccentricity $e_1$ and $e_2$ of approximately thirty millimeters, enables a maximum longitudinal speed of the order of fifty six metres per minute to be imparted to the worms 38 and 39, the speed $v_2$ naturally having this value. As regards the speed $v_1$, this may have with advantage a value of approximately ten metres per minute, which results in:

$v_1 + v_2 = 10 + 56 = +66$ metres per minute
$v_1 - v_2 = 10 - 56 = -46$ metres per minute These figures are in no way intended in a limiting sense, and the amplitudes of the reciprocatory movements imparted to the articles may be comprised, for example, between ten and one hundred millimetres.

As already stated, if the circumferential velocity of the two worms 38 and 39 differs slightly because of a different number of teeth in the spur gears 41 and 42, the circumferential velocities pertaining to the two beds of rollers will be slightly different. In this way a relative movement is obtained between the two faces of the hoods 9, which consequently results in a "crozing" effect, that is to say, the two layers of the hood do not remain continuously in the same position, which would lead to the risk of indelible marks on the hat body. It is to be noted that this "crozing" effect can also be obtained either in combination with or without the above means, for example by a staggering of the axial movements of the two worms 38 and 39. The two crank pins may be staggered by a few degrees. There then results a relative movement between the beds of rollers, which causes, in addition to an accelerated felting action, a displacement of the two faces of each hood.

Naturally, the invention is in no way limited to the form of embodiment illustrated and described, which has been selected merely by way of example.

Thus, for example, there may be superposed to the above specified movements of the rollers 6 and 8 a rapid relative shaking movement of the kind already known.

The articles to be felted being moved with a rapid reciprocatory movement between the rollers, they are subjected to the rapid shaking movements of the rollers only for a greatly reduced period as compared with the known felting machines, and on this account the deterioration which takes place is very much smaller.

There may also be adopted a progressive variation in the tangential speed of the rollers along the machine, either by variation in the diameter of the successive rollers 6 or 8, these being driven at the same angular velocity, or by furnishing the rollers with the same diameter and driving them by means of differently threaded portions of the worms 38 and 39, which impart thereto a progressively decreasing (or increasing) speed from the feed point to the exit point for the hoods or other articles.

The outer surface of the rollers 6 and 8 may be channelled and grooved parallel to the axis or in helical or inclined fashion, as is customary in the case of the rollers of known felting machines.

Finally, the machine may also comprise more than two superimposed beds of rollers.

Having now described my invention what I claim as new and desire to secure by Letters Patents is:

1. In a multi-roller felting machine for articles made of fibers possessing felting properties: a framework, at least two superimposed beds of co-operating rollers supported by said framework, a plurality of pinions equal in number to the number of said rollers, each pinion being rotatably connected to a roller, at least two worms each co-operating with one of said beds of rollers and mounted for rotary and sliding movement in said framework and each meshing with all of said pinions pertaining to the corresponding bed of rollers, a spur gear mounted rigidly on each of said worms for rotation therewith, an electric motor carried by said framework, a spur pinion rotatably mounted in said framework, transmission means between said spur pinion and said electric motor, said spur pinion meshing with the spur gear on each of the said worms for the purpose of rotating said worms at substantially the same rotary speed; and a second driving means for imparting alternate axial movements to each of said worms at substantially the same linear speed.

2. A felting machine as claimed in claim 1, wherein said spur gears on said worms are identical.

3. A felting machine as claimed in claim 1, wherein said spur gears on said worms have a slightly varying number of teeth.

4. In a multi-roller felting machine for felt articles made of fibers possessing felting properties: a framework, two superimposed beds of co-operating rollers supported by said framework, pinions equal in number to the number of said rollers, two worms each co-operating with one of said beds of rollers and mounted for rotary and sliding movement in said framework and each meshing with all of said pinions pertaining to the corresponding bed of rollers, a spur gear mounted rigidly on each of said worms for rotation therewith, an electric motor carried by said framework, a spur pinion rotatably mounted in said framework, transmission means between said motor and said spur pinion, the latter meshing with the spur gear on each of the said two worms for the purpose of rotating the said worms at substantially the same first speed, an auxiliary electric motor carried by said framework, a shaft mounted for rotation in said framework and comprising two eccentric portions, transmission means between said auxiliary motor and said shaft mounted in the framework, and two connecting elements pivotally connecting each of said eccentric portions with one of said worms for the purpose of imparting alternate axial movements to said worms.

5. In a multi-roller felting machine for articles made of fibers possessing felting properties: a framework, at least two superimposed beds of co-operating rollers supported by said framework, identical pinions equal in number to the number of said rollers, each pinion being arranged to be rigidly rotatable with a roller, worms equal in number to the number of beds of rollers, all of said worms having uniform and identical helical threads and each worm being mounted for rotary and sliding movement in said framework and meshing wtih the pinions of all rollers pertaining to the corresponding bed, a first driving means for imparting rotary motion to all of said worms at substantially the same rotary speed, and a second driving means for imparting alternate axial movements to each of said worms at substantially the same linear speed.

6. In a multi-roller felting machine for articles made of fibers possessing felting properties: a framework, at least two superimposed beds of co-operating rollers supported by said framework, pinions equal in number to the number of said rollers, each pinion being arranged to be rigidly rotatable with a roller, worms equal in number to the number of beds of rollers, each worm co-operating with one of said beds, being mounted for rotary and sliding movement in said framework and meshing with all the pinions of the corresponding cooperating bed, the diameters of said rollers, pinions and portions of the helical threads of said worms meshing with said pinions being such that the transmission ratios between said worms and at least certain of said rollers differ slightly one from the other, a first driving means for imparting rotary motion to all of said worms at substantially the same rotary speed, and a second driving means for imparting alternate axial movements to each of said worms at substantially the same linear speed.

7. In a multi-roller felting machine for articles made of fibers possessing felting properties: a framework, at least two superimposed beds of rollers, the rollers of all beds except the lowermost one being fixed in height and being mounted to be rotary in said framework, bearings which are movable vertically in relation to said framework and in which are mounted to be rotary the rollers of said lowermost bed, means for mechanically supporting and adjusting said bearings in height, pinions equal in number to the number of said rollers, the geometrical axes of said pinions being fixed and the pinions pertaining to the rollers of all beds except the lowermost one being directly supported by the adjacent ends of said rollers, connecting means between said pinions and the rollers of the lowermost bed, such means being adapted to permit of displacement of said latter rollers in height, worms equal in number to the number of beds of rollers, each worm co-operating with one of said beds, being mounted for rotary and sliding movement in said framework and meshing with all the pinions of the corresponding co-operating bed, a first driving means for imparting rotary motion to all of said worms at substantially the same speed, and a second driving means for imparting alternate axial movements to each of said worms at substantially the same speed.

8. A felting machine as claimed in claim 7, wherein said means for mechanically supporting and adjusting the movable bearings for the lowermost bed of rollers comprise in combination two vertically movable, horizontal and parallel bearers, two pivotally connected supporting devices forming two deformable parallelograms disposed in parallel fashion one to the other, each below one of said bearers, two horizontal shaft members for connecting said two supporting devices to the framework, connecting means between each of said supporting devices and the lower face of the corresponding bearer, a single operating mechanism for deforming both said supporting devices simultaneously and in parallel fashion, resilient means on the upper face of each of said bearers agreeing in number with the number of rollers in said lowermost bed, and vertical posts mounted in sliding fashion in said framework, each said post resting on one of said resilient means and supporting one of said movable bearings.

9. A felting machine as claimed in claim 8, wherein said single operating mechanism for deforming the two supporting devices simultaneously and in parallel fashion comprises in combination a yoke piece secured to said framework, a first bush having two trunnions with a common horizontal transverse axis mounted to be rotary in the said yoke piece, a screw mounted to be freely rotary by means of a bearing in said bush, a manipulating member secured to one end of said screw, a lever having one of its ends in the form of a fork whilst the other end is keyed on to one of the horizontal shaft members for connecting said supporting devices to said framework, said shaft member being rotary in said framework and said supoprting devices being keyed thereon, and a second threaded bush into which there is screwed the said screw and which is rotatable about an axis perpendicular to that of the said screw in said fork of said lever.

10. A felting machine as claimed in claim 7, wherein each of said connecting means between the pinions and the rollers of the lowermost bed comprises in combination two oppositely disposed plates secured respectively to the end of one of said rollers and to one of the bearing portions of the corresponding pinion, each of said plates carrying an eccentric pin on the face thereof opposite the other plate, and a short rod mounted in oscillatory fashion on the pins of said plates.

11. In a multi-roller felting machine for articles made of fibers possessing felting properties: a framework, at least two superimposed beds of co-operating rollers supported by said framework, pinions equal in number to the number of said rollers, each pinion being arranged to be rigidly rotatable with a roller, worms equal in number to the number of beds of rollers, each worm co-operating with one of said beds, being mounted for rotary and sliding movement in said framework and meshing with all the pinions of the corresponding bed, a first driving means for imparting rotary motion to all of said worms at substantially a same first speed, a second driving means for imparting alternate axial movements to each of said worms at a substantially equal speed differing from said first speed, and a lubricating gear pump actuated by one of said driving means for said worms.

References Cited in the file of this patent

UNITED STATES PATENTS

| Number | Name | Date |
|---|---|---|
| 1,533,349 | Genest | Apr. 14, 1925 |
| 1,716,401 | Wheeler | June 11, 1929 |
| 1,984,701 | Reynolds | Dec. 18, 1934 |
| 2,093,709 | Cassé | Sept. 21, 1937 |
| 2,427,007 | Lambach | Sept. 9, 1947 |
| 2,506,855 | Cassé | May 9, 1950 |

FOREIGN PATENTS

| Number | Country | Date |
|---|---|---|
| 240,229 | Great Britain | Sept. 25, 19-- |